(12) United States Patent
Aramburu Lasa

(10) Patent No.: US 8,221,195 B2
(45) Date of Patent: Jul. 17, 2012

(54) PROCESS FOR GRINDING DIES

(75) Inventor: Andoni Aramburu Lasa, Zarautz (ES)

(73) Assignee: Danobat, S. Coop., Elgoibar (ES)

( * ) Notice: Subject to any disclaimer, the term of this patent is extended or adjusted under 35 U.S.C. 154(b) by 493 days.

(21) Appl. No.: 12/385,599

(22) Filed: Apr. 14, 2009

(65) Prior Publication Data

US 2009/0264048 A1    Oct. 22, 2009

(30) Foreign Application Priority Data

Apr. 17, 2008  (ES) .................... 200801097

(51) Int. Cl.
  *B24B 51/00*   (2006.01)
  *B24B 7/16*    (2006.01)
(52) U.S. Cl. ................ 451/11; 451/44; 451/51
(58) Field of Classification Search ........... 451/5, 9–11, 451/24, 173, 44, 27, 51, 52, 57; 29/888.075, 29/888.076
See application file for complete search history.

(56) References Cited

U.S. PATENT DOCUMENTS

| 5,197,228 A | * | 3/1993 | Sharkey et al. | 451/5 |
| 5,359,814 A | * | 11/1994 | Baltazar et al. | 451/5 |
| 2006/0128274 A1 | * | 6/2006 | Nyffenegger | 451/11 |
| 2007/0066182 A1 | * | 3/2007 | Chang et al. | 451/5 |

* cited by examiner

*Primary Examiner* — Dung Van Nguyen
(74) *Attorney, Agent, or Firm* — The Nath Law Group; Jerald L. Meyer

(57) ABSTRACT

The invention relates to a machine and process for grinding dies, in which the work axis (CO) of the plate (2.1) in which the die (1) to be machined is anchored is controlled at all the points of its angular movement, allowing the interpolation of the movements of this work axis (CO) with those of an axis of rotation (BO) and with those of respective axes (X and Z), such that the machines has four axes of interpolation, which allows machining dies (1) with their inner or outer diameter rounded or non-rounded and with their transition between these diameters and the side faces constant or variable by means of a single grinding process.

10 Claims, 5 Drawing Sheets

PROCESS FOR GRINDING DIES

FIELD OF THE ART

The object of the present invention is a machine for grinding dies and the work process developed with said machine.

STATE OF THE ART

The dies in question are those which are mainly used in cold forming technology for manufacturing metal cans, metal casings, parts of these products, etc.

This type of die, in its basic configuration, adopts an annular shape with a central hole, a front face and a rear face, but it can also adopt other shapes such as that of conical surfaces, etc.

Although everything described in the present invention is valid for any type of die, for the sake of simplicity in the explanation, dies with an annular configuration, with a front face and a rear face, will be referred to.

In the same way and although the central hole and/or the outer shape are not cylindrical, the terminology of "diameters" will be used to refer to both the outer measurement of the die and the measurement of its central hole, identifying them as outer diameter and inner diameter. According to this, the dies maintaining a constant diameter will be identified as dies with rounded outer and/or inner diameter and dies having different diameter measurements on their outside or in their central hole, adopting oval shapes, elliptical shapes, rhomboidal shapes with rounded ends, square shapes with rounded ends, etc. will be identified as non-rounded.

These dies are also of the type of those which can have a transition of variable radius from the outer and/or inner diameter of the die to the corresponding front and/or rear faces of the die.

This transition of variable radius from the inner or outer diameter of the die to its front and/or rear faces can be defined by two or more different radius measurements.

This type of die has to be manufactured according to processes providing a high quality in the surface finishes thereof, as well as in the shape of the diameters and in the transition from the inner or outer diameter to the front and/or rear faces.

Up until now, a process with electroerosion machines was used to manufacture this type of die, which meant slow and complex work processes.

The use of grinding machines was also known, but such machines only allowed manufacturing cylindrical dies with rounded inner and outer diameter and without variable radii in the transition from said diameters to the front and/or rear faces of the die.

Indeed, up until now the use of grinding machines for manufacturing these dies with a rounded diameter and a transition of non-variable radius was known, which machines were formed according to a morphology which allowed the interpolation of three axes, "X", "Z" and "BO".

A process with several phases was used to manufacture dies with non-rounded shapes in the inner or outer diameter, followed by a transition of variable or constant radius tangential to the angle of one of the faces of the die, as described below.

First grinding machine process or phase. In this phase, the non-rounded diameter shape was achieved by the interpolation of the "X" and "CO" axes and the required surface finish quality could be achieved by means of an oscillation movement of the "Z" axis.

Second electroerosion machine process or phase. In this phase, the die is machined in an electroerosion machine to achieve the radius of transition from the inner diameter of the die to one of the faces of the die.

Third phase, the radius of transition is manually polished to achieve the required surface finish.

OBJECT OF THE INVENTION

According to the solution now proposed, the die is obtained through a single grinding process, using a straight grinding wheel as a tool. The machine has a head, which is provided with a fixing device, such as anchoring clamps, a magnetic plate or the like for fixing the die to be ground, with a "CO" work axis in which the angular position of the fixing device and, therefore, of the die to be ground can be controlled at any point, such that it allows the interpolation of the "CO" work axis along with the "X", "Z" and "BO" axes, giving rise to an interpolation in four axes which allows obtaining, by means of grinding, a die the inner and/or outer diameter of which may or may not be rounded and the radius of transition of which from said diameters to the front and/or rear faces may be constant or variable, and in the event of being variable, with at least two different dimensions.

This type of die can thus be manufactured by means of this machine according to a different process in which, compared to traditional processes, a grinding process is now carried out with software containing the calculations and performance of the necessary movements of interpolation of the "CO", "X", "Z" and "BO" axes.

DETAILED DESCRIPTION OF THE INVENTION

Figure 1:
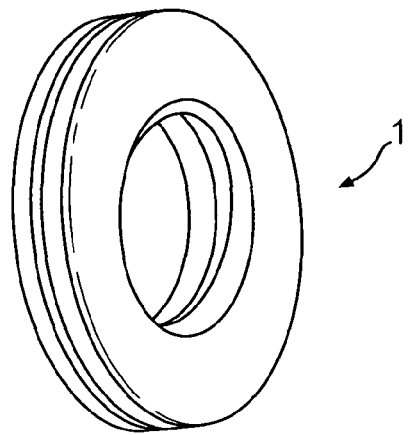
FIG. 1 shows a schematic perspective view of a die (1).
Figure 2:
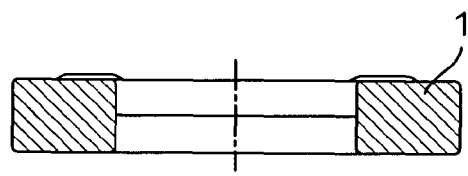
FIG. 2 shows section II-II indicated in FIG. 3.
Figure 3:
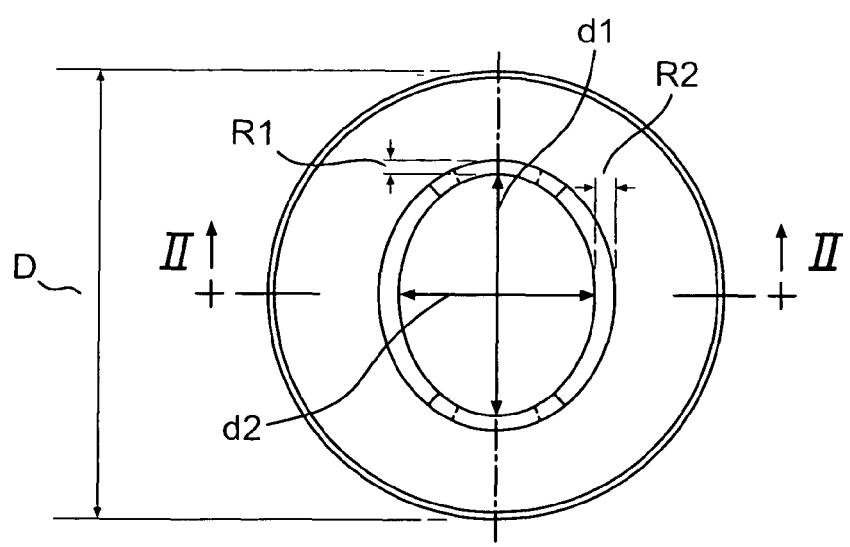
FIG. 3 is an elevational view of the die (1) in order to be able to see its non-rounded inner diameter and the transition of radii (R1 and R2) between the inner diameter and one of the front or rear faces of the die (1).

The object of the present invention is a machine for grinding dies, for cold forming, of the type of die like that depicted in FIGS. 1, 2 and 3, and identified with reference number (1).

This die (1) has a general annular configuration, with an inner hole which is elliptical in plan defined by two different diameters (d1) and (d2). The outer diameter (D) is in this case circumferential in plan, but it could adopt other shapes, for example the same as that of the inside. All in all, these are dies (1) the inner and/or outer diameter of which can be circumferential in plan, which is referred to as rounded diameters; or can be non-rounded and adopt other configurations such as, for example, elliptical, oval, polygonal with rounded corners, etc.

This type of die (1) can also have as a feature that the transition between the inner or outer diameter and the front and/or rear faces of the die (1) is either of a constant radius or of a variable radius. In the event of being of a variable radius, they have at least two different dimensions. According to the non-limiting practical embodiment of FIGS. 1, 2 and 3, the transition between the inner diameter and the front face is carried out according to two different radii identified as (R1, R2).

Figure 4:
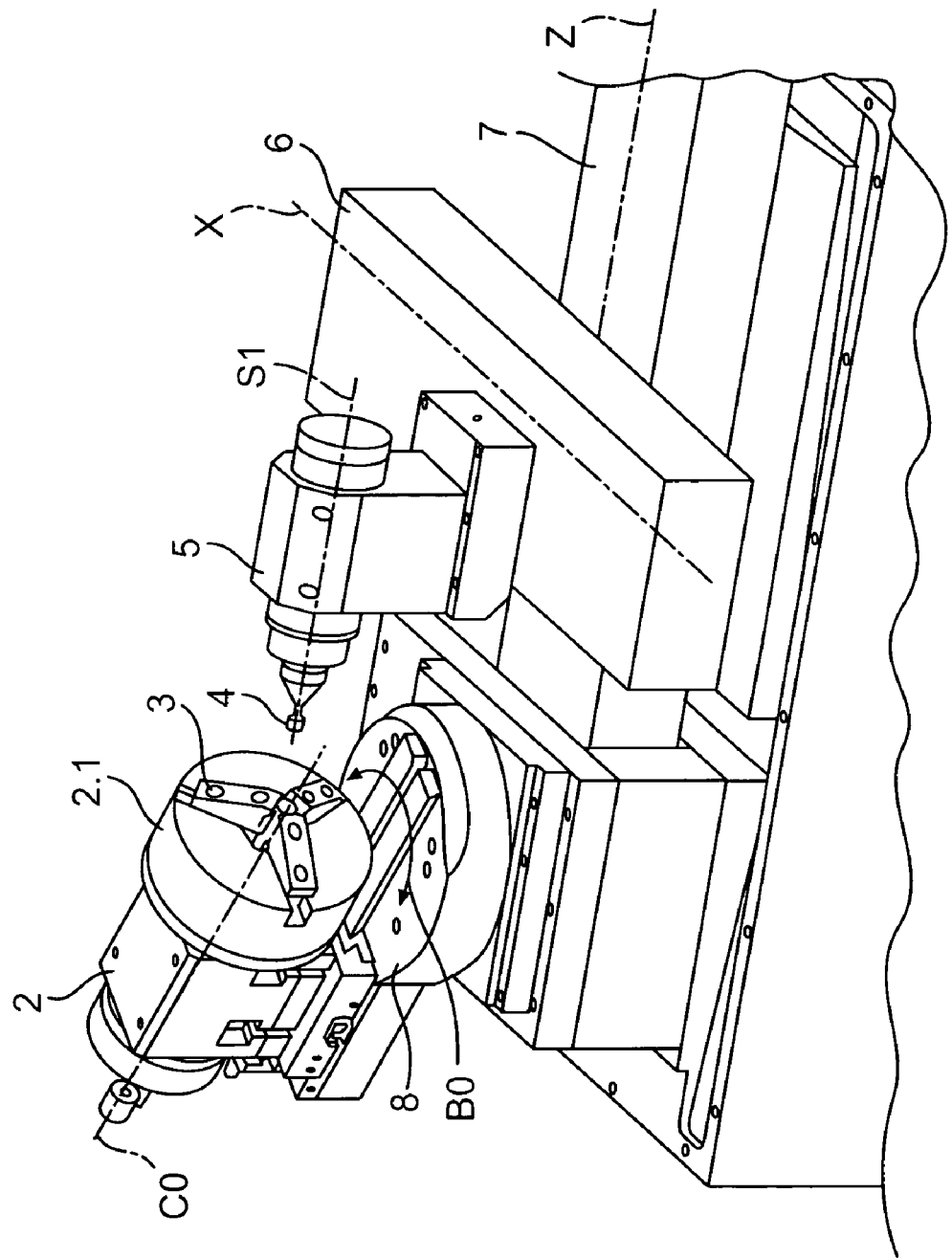
FIG. 4 is a schematic perspective view of a machine with a configuration according to the object of the present invention.
Figure 5:
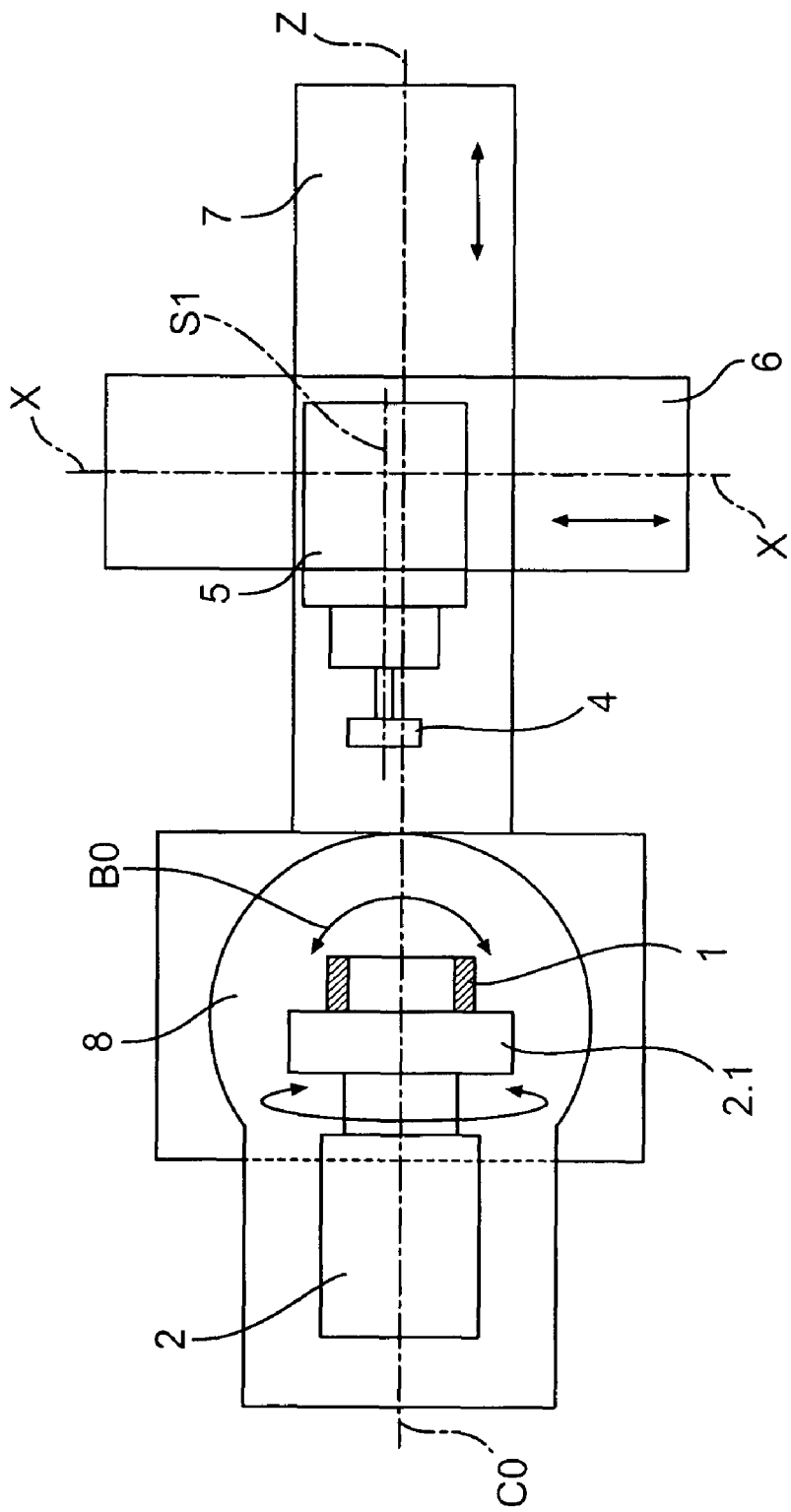
FIG. 5 is an upper plan view of a machine with the configuration of FIG. 4.

FIGS. 4 and 5 show a machine the configuration of which is the following: at the left part there is the head (2) incorporating the plate (2.1) in which there is arranged a fixing device (3) for fixing the die (1) to be machined. The plate (2.1) can rotate about the work axis (CO).

The head (2) is arranged on a lower base (8) which can rotate according to an axis of rotation (BO).

The spindle (5) having the corresponding grinding tool or wheel (4) rotating about the grinding axis (S1) is arranged at the right part of the machine.

This spindle (5) is assembled on respective cross slide tables (6 and 7) allowing the movement of the tool (4) according to the axes (X and Z).

Up to this point, this machine configuration is conventional, allowing the interpolation of the three axes (X, Z and BO), whereas the rotation of the plate (2.1) about the axis (CO) is carried out according to the speed selected in each case, i.e., at the revolutions per minute chosen for each job, but without said axis (CO) being able to be interpolated with respect to the other three axes (X, Z and BO).

According to the solution now proposed, the axis (CO) is controlled in its position at each point of the angular movement of the plate (2.1), such that the necessary movements of interpolation of the four axes (CO, X, Z and BO) are established through the corresponding software.

In other words, compared to traditional solutions of machines with three interpolated axes (X, Z and BO) or (X, Z and CO), the interpolation of the movement of four axes (CO, X, Z and BO) is now carried out, which allows manufacturing dies (1) with the required finish quality and in the different diameter and transition options as will be seen below.

Indeed, the non-round shapes of the inner and/or outer diameter of the die (1) are obtained by means of a work process in which the movements of the axis (CO) and of the axis (X) are interpolated.

The required surface finish is thus obtained with oscillation movements of the axis (Z).

The corresponding software then performs the coupling of the movements of interpolation of four axes, specifically of the axes (BO, CO, X and Z), to create constant or variable radii of transition between the inner and/or outer diameter of the die (1) and its front and/or rear faces.

While these transitions of variable radius are obtained, the calculation and the coupling of a movement of correction of the axes (X) and occasionally (Z) depending on the position of the axis (CO) are additionally performed.

The grinding process is completed by means of an oscillation stroke of the axis (Z), to thus obtain a surface finish of the ground parts with the suitable quality.

Dies (1) with a transition of non-variable radius, i.e., of constant radius, could logically also be manufactured.

In such case, the constant radius would be obtained by means of a movement of interpolation of the axis (B), axis (C), axis (X) and axis (Z).

In other words, the axes (X and CO) are interpolated to obtain the non-rounded shape of the inner and/or outer diameters of the die (1).

A second calculation affecting the position of the axis (BO), axis (X) and axis (Z) is added to obtain a transition of constant radius between the inner and/or outer diameter and the surface of the front face of the die (1).

In addition, a third calculation affecting the position of the axis (CO), axis (X) and occasionally of the axis (Z) is added to obtain a transition of non-constant radius between the inner and/or outer diameter and the front surface of the die (1).

Finally, it must be indicated that in any of the previous variants, an oscillation stroke of the grinding wheel (4) is carried out by means of an oscillation movement of the axis (Z) to thus achieve a suitable surface finish.

In other words, the solution now proposed provides as novelty obtaining the radius of transition in dies (1) with non-rounded diameters by means of a grinding process as a result of the existence of the axis of rotation (BO) and its interpolation with the axes (X and Z).

Other novelty is the possibility of being able to obtain, by means of a grinding process, a variable radius of transition by means of the interpolation of the axis (CO) and of the axis (X) and occasionally axis (Z), both in dies (1) with rounded diameters and non-rounded diameters.

In all the cases, the interpolation of four axes (BO, CO, X and Z) occurs.

Figure 6:
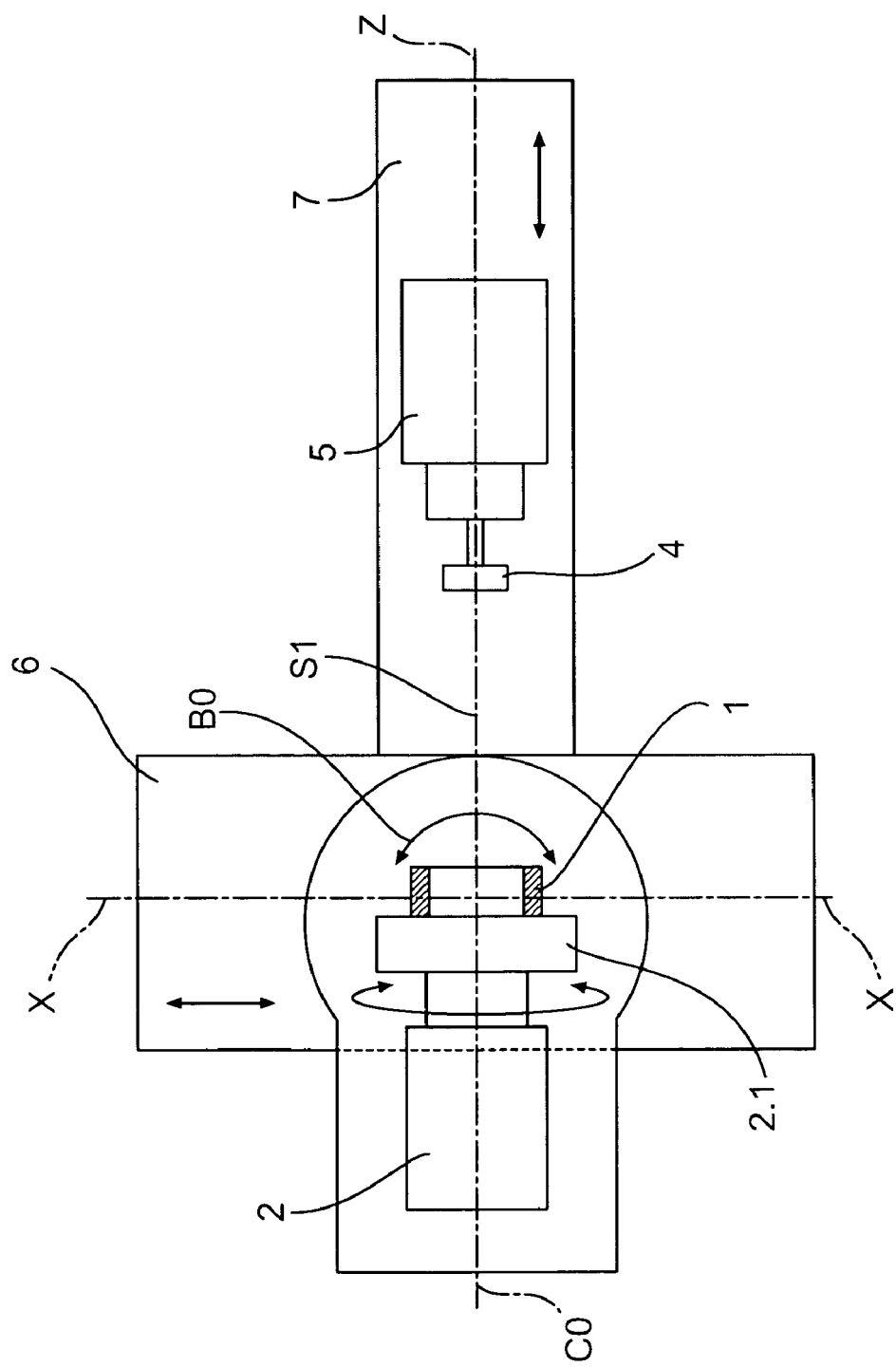
FIGS. 6 and 7 are respective elevational views showing respective possible alternatives in the configuration of the machine, according to the invention.
Figure 7:
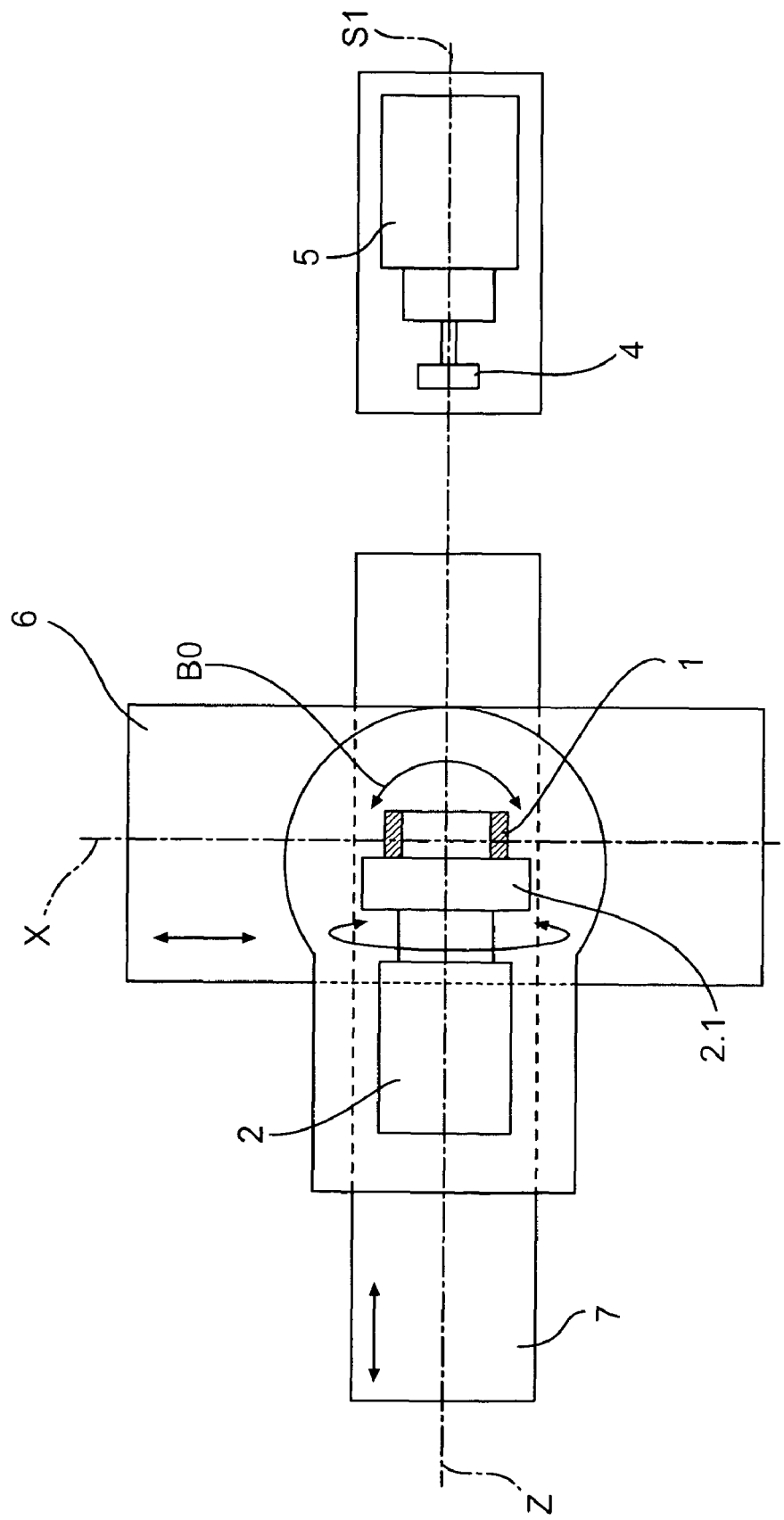

Maintaining the essential concept of the present invention, which is that the machine for grinding dies (1) has four interpolated axes (BO, CO, X and Z), it has been provided that it can adopt different configurations, as is seen in FIGS. 6 and 7.

According to the configuration of FIG. 6, the head (2) incorporating the plate (2.1) for anchoring the die (1) to be ground is also assembled on the rotational axis (BO), but the latter is now assembled on the table (6) of the axis (X).

According to the configuration of FIG. 7, the head (1) is the one which is now arranged on a cross slide table with the axes (X and Z).

The invention claimed is:

1. A process for grinding dies, comprising:
grinding non-circular shapes of an inner hole of a die and/or of its outer contour by means of a movement of interpolation of a base axis of location, a work axis and movements of interpolation of at least one slide axis, the slide axis providing relative movement in linear directions along the slide axis with respect to the base axis of location; and
controlling angular movement along the work axis to allow interpolation of the movements about the work axis and the slide axes, and providing a constant radius of transition between a surface of said inner hole and/or of the outer contour and obtaining a surface of a front and/or rear face of the die by means of the coupling of the movements of interpolation of the axes.

2. The process for grinding dies according to claim 1, further comprising obtaining a transition of variable radius, by grinding, by means of the interpolation of the work axis, and the slide axis.

3. The process for grinding dies according to claim 1, further comprising providing at least one additional slide axis providing relative movement in linear directions along the additional slide axis with respect to the base axis of location in a different linear direction from said one slide axis.

4. The process for grinding dies according to claim 3, further comprising obtaining a transition of variable radius, by grinding, by means of the interpolation of the work axis, and said one slide axis, with occasional additional interpolation of said additional slide axis.

5. The process for grinding dies according to claim 1, further comprising:
providing at least one additional slide axis providing relative movement in linear directions along the additional slide axis with respect to the base axis of location; and
using an oscillation of a grinding wheel to obtain a surface grinding finish of the non-rounded surfaces and of the radius of transition through an oscillating movement along said additional slide axis.

6. The process for grinding dies according to claim 1, further comprising:
provide at least one additional slide axis providing relative movement in linear directions along the additional slide axis with respect to the base axis of location; and
calculating and coupling a movement to effect correction of the slide axes in accordance with a position of the work axis during the process for the varying of the transition.

7. A process for grinding of a die, the process comprising:
rounding an inner hole and/or outer contour of the die by means of a movement of interpolation of a work axis and at least one slide axis; and
varying, in at least two radii, a transition between surfaces of the rounded contour and surfaces of front and/or rear faces.

8. The process for grinding dies according to claim 7, further comprising:
providing at least one additional slide axis providing relative movement in linear directions along the additional slide axis with respect to the base axis of location; and
obtaining a transition of variable radius, by grinding, by means of the interpolation of the work axis, and said one slide axis, with occasional additional interpolation of said additional slide axis.

9. The process for grinding dies according to claim 7, further comprising:
providing at least one additional slide axis providing relative movement in linear directions along the additional slide axis with respect to the base axis of location; and
using an oscillation of a grinding wheel to obtain a surface grinding finish of the non-rounded surfaces and of the radii of transition through an oscillating movement along said additional slide axis.

10. The process for grinding dies according to claim 7, further comprising:
providing at least one additional slide axis providing relative movement in linear directions along the additional slide axis with respect to the base axis of location; and
calculating and coupling a movement to effect correction of the slide axes in accordance with a position of the work axis during the process for the varying of the transition.

\* \* \* \* \*